US008635596B2

(12) United States Patent
Sanghvi et al.

(10) Patent No.: US 8,635,596 B2
(45) Date of Patent: Jan. 21, 2014

(54) MODEL-BASED EVENT PROCESSING

(75) Inventors: Ashvinkumar J. Sanghvi, Sammamish, WA (US); Lorenzo Rizzi, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1629 days.

(21) Appl. No.: 11/379,757

(22) Filed: Apr. 21, 2006

(65) Prior Publication Data

US 2007/0250525 A1 Oct. 25, 2007

(51) Int. Cl.
*G06F 9/44* (2006.01)

(52) U.S. Cl.
USPC .......................... 717/120; 717/104; 717/126

(58) Field of Classification Search
None
See application file for complete search history.

(56) References Cited

U.S. PATENT DOCUMENTS

| | | | | |
|---|---|---|---|---|
| 5,528,516 | A * | 6/1996 | Yemini et al. | 702/181 |
| 5,661,668 | A * | 8/1997 | Yemini et al. | 702/186 |
| 6,167,564 | A * | 12/2000 | Fontana et al. | 717/104 |
| 6,175,956 | B1 * | 1/2001 | Hicks et al. | 717/114 |
| 6,249,755 | B1 * | 6/2001 | Yemini et al. | 702/183 |
| 6,292,810 | B1 * | 9/2001 | Richards | 715/201 |
| 6,381,735 | B1 * | 4/2002 | Hunt | 717/158 |
| 6,405,364 | B1 * | 6/2002 | Bowman-Amuah | 717/120 |
| 6,629,106 | B1 | 9/2003 | Narayanaswamy et al. | |
| 6,662,357 | B1 * | 12/2003 | Bowman-Amuah | 717/120 |
| 6,718,535 | B1 * | 4/2004 | Underwood | 717/120 |
| 7,096,459 | B2 * | 8/2006 | Keller et al. | 717/124 |
| 7,240,324 | B2 * | 7/2007 | Casati et al. | 717/104 |
| 7,240,325 | B2 * | 7/2007 | Keller | 717/104 |
| 7,376,937 | B1 * | 5/2008 | Srivastava et al. | 717/126 |
| 7,398,511 | B2 * | 7/2008 | El-Shimi et al. | 717/104 |
| 7,409,593 | B2 * | 8/2008 | Aaron | 714/26 |
| 7,559,053 | B2 * | 7/2009 | Krassovsky et al. | 717/126 |
| 7,721,152 | B1 * | 5/2010 | Joshi et al. | 714/25 |
| 7,735,142 | B2 * | 6/2010 | Aaron | 726/25 |
| 8,031,634 | B1 * | 10/2011 | Artzi et al. | 370/254 |
| 8,161,330 | B1 * | 4/2012 | Vannatter et al. | 714/48 |
| 8,214,290 | B1 * | 7/2012 | Vannatter et al. | 705/43 |
| 2002/0072830 | A1 * | 6/2002 | Hunt | 701/1 |
| 2002/0104068 | A1 * | 8/2002 | Barrett et al. | 717/104 |
| 2003/0074648 | A1 * | 4/2003 | Brassard et al. | 717/104 |
| 2003/0131338 | A1 * | 7/2003 | Georgalas | 717/104 |

(Continued)

FOREIGN PATENT DOCUMENTS

| | | |
|---|---|---|
| JP | 2001125854 | 5/2001 |
| JP | 2005538459 | 12/2005 |

(Continued)

OTHER PUBLICATIONS

Boris Gruschke, "Integrated Event Management: Event Correlation Using Dependency Graphs", University of Munich, 1998, <http://www.nm.ifi.lmu.de/common/pub/Publikationen/grus98a/PDF-Version/grus98a.pdf>, pp. 1-12.*

(Continued)

*Primary Examiner* — Thuy Dao
*Assistant Examiner* — Samuel Hayim
(74) *Attorney, Agent, or Firm* — Lee & Hayes, PLLC (57) ABSTRACT

Model-based event processing is described. In an embodiment, a model of a system includes managed entities and relationships between the managed entities. Events associated with the managed entities are identified and determined to be correlated if the managed entities with which the events are associated have a relationship according to the model.

13 Claims, 5 Drawing Sheets

(56) References Cited

U.S. PATENT DOCUMENTS

| | | |
|---|---|---|
| 2003/0191797 A1 | 10/2003 | Gurevich et al. |
| 2003/0196168 A1* | 10/2003 | Hu .................... 715/513 |
| 2004/0049565 A1* | 3/2004 | Keller et al. ........... 709/223 |
| 2004/0060037 A1* | 3/2004 | Damm et al. ........... 717/104 |
| 2004/0064803 A1* | 4/2004 | Graves et al. .......... 717/104 |
| 2004/0083448 A1* | 4/2004 | Schulz et al. .......... 717/101 |
| 2004/0123254 A1* | 6/2004 | Geist et al. ............... 716/4 |
| 2004/0148586 A1* | 7/2004 | Gilboa ................. 717/108 |
| 2004/0225927 A1* | 11/2004 | Warpenburg et al. ...... 714/47 |
| 2004/0249720 A1* | 12/2004 | Wookey et al. ........... 705/26 |
| 2005/0075996 A1 | 4/2005 | Dettinger et al. |
| 2005/0091227 A1 | 4/2005 | McCollum et al. |
| 2005/0222810 A1* | 10/2005 | Buford et al. .......... 702/183 |
| 2005/0222811 A1* | 10/2005 | Jakobson et al. ....... 702/183 |
| 2005/0228763 A1* | 10/2005 | Lewis et al. ............. 706/1 |
| 2005/0273788 A1* | 12/2005 | Gupta ................. 719/310 |
| 2006/0020582 A1 | 1/2006 | Dettinger et al. |
| 2006/0025985 A1* | 2/2006 | Vinberg et al. .......... 703/22 |
| 2006/0156282 A1* | 7/2006 | Mathew ............... 717/126 |
| 2006/0190927 A1* | 8/2006 | Albahari et al. ........ 717/104 |
| 2006/0232927 A1* | 10/2006 | Vinberg et al. ......... 361/687 |
| 2006/0235650 A1* | 10/2006 | Vinberg et al. ......... 702/182 |
| 2006/0235962 A1* | 10/2006 | Vinberg et al. ......... 709/224 |
| 2007/0005320 A1* | 1/2007 | Vinberg et al. .......... 703/13 |
| 2007/0016393 A1* | 1/2007 | Vinberg et al. .......... 703/13 |
| 2007/0074149 A1* | 3/2007 | Ognev et al. .......... 717/126 |
| 2007/0203952 A1* | 8/2007 | Baron et al. ........... 707/200 |
| 2007/0234277 A1* | 10/2007 | Lei et al. ............. 717/104 |
| 2008/0059214 A1* | 3/2008 | Vinberg et al. ........... 705/1 |

FOREIGN PATENT DOCUMENTS

| | | |
|---|---|---|
| JP | 2006510133 | 3/2006 |
| WO | WO 9921086 A1 * | 4/1999 |
| WO | WO2004061681 | 7/2004 |
| WO | WO2005045559 A2 | 5/2005 |

OTHER PUBLICATIONS

Yan Liu et al., "A Configurable Event Correlation Architecture for Adaptive J2EE Applications", IEEE, 2007, <http://ieeexplore.ieee.org/stamp/stamp.jsp?tp=&arnumber=4159658>, pp. 1-10.*

Atif Memon et al., "Coverage Criteria for GUI Testing", ACM, 2001, <http://delivery.acm.org/10.1145/510000/503244/p256-memon.pdf>, p. 1-12.*

Chinese Office Action mailed Mar. 18, 2011 for Chinese Patent Application No. 200780014114.X, a counterpart foreign application of U.S. Appl. No. 11/379,757 pp. 1-6 only.

Chinese Office Action mailed Feb. 13, 2012 for Chinese patent application No. 200780014114.X, a counterpart foreign application of U.S. Appl. No. 11/379,757, 8 pages.

European Office Action mailed Jan. 31, 2012 for European patent application No. 07752491.6, a counterpart foreign application of U.S. Appl. No. 11/379,757, 5 pages.

Chinese Office Action mailed Mar. 18, 2011 for Chinese Patent Application No. 200780014114.X, a counterpart foreign application of U.S. Appl. No. 11/379,757, 13 pages, pages 1-6 only.

Chinese Office Action mailed May 23, 2012 for Chinese patent application No. 200780014114.X, a counterpart foreign application of U.S. Appl. No. 11/379,757, 6 pages, pages 1-6 only.

Japanese Office Action mailed Apr. 17, 2012 for Japanese patent application No. 2009-506493, a counterpart foreign application of U.S. Appl. No. 11/379,757, 9 pages, pages 1-5 only.

Japanese Office Aciton mailed Nov. 2, 2012 for Japanese patent application No. 2009-506493, a counterpart foreign application of U.S. Appl. No. 11/379,757, 4 pages, pp. 1-2 only.

* cited by examiner

MODEL-BASED EVENT PROCESSING

BACKGROUND

Computers have become increasingly commonplace in our world and offer a variety of functionality. Some computers are designed primarily for individual use, while others are designed primarily to be accessed by multiple users and/or multiple computers concurrently. Varied functionality can be realized by a computer through the use of different hardware components as well as different software applications installed on the computer.

Although the variety of available computer functionality and software applications is a tremendous benefit to the end users of the computers, such a wide variety can be problematic for system administrators who are tasked with keeping computers running. This is especially the case with computing systems containing a large number of different components that must work together and function properly for the entire computing system to operate properly.

For this and other reasons, event processing has become a core capability for managed computing systems. In general, event processing entails deriving meaning from an inflow of events. Such meaning is often obscured, however, by the sheer volume of events associated with the various resources in a complex computing system. For example, factors including the number of users accessing the computing system, the number of applications running in the computing system, and the number of tasks or operations being performed by the computing system can result in a flood of diverse events associated with a wide range of available computing system resources.

SUMMARY

This summary is provided to introduce simplified concepts of model-based event processing which are further described below in the Detailed Description. This summary is not intended to identify essential features of the claimed subject matter, nor is it intended for use in determining the scope of the claimed subject matter.

In an embodiment, a model of a system includes managed entities and relationships between the managed entities. Events associated with the managed entities are identified and determined to be correlated if the managed entities with which the events are associated have a relationship according to the model.

BRIEF DESCRIPTION OF THE DRAWINGS

The same numbers are used throughout the drawings to reference like features.

DETAILED DESCRIPTION

Model-based event processing is described in which embodiments provide for the correlation of events associated with a variety of managed entities. In one exemplary implementation, relationships among the managed entities are stored in a model. Events generated by the managed entities are then processed in light of the model, with events being deemed correlated when they are associated with managed entities having a relationship under the model.

While aspects of described systems and methods for model-based event processing can be implemented in any number of different computing systems, environments, and/or configurations, embodiments of model-based event processing are described in the context of the following exemplary system architecture(s) and method(s).

An Exemplary System

Figure 1:
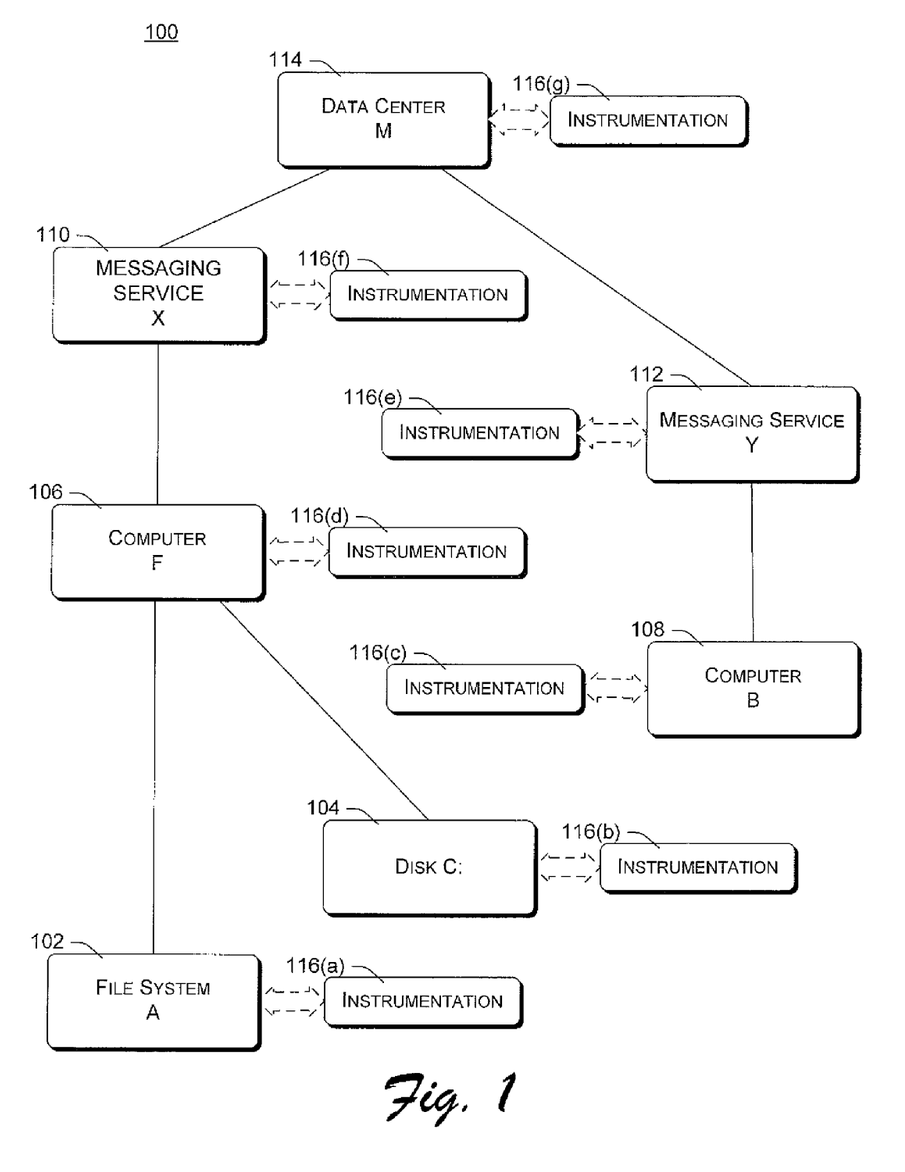
FIG. 1 illustrates an exemplary system, the events from which can be processed using embodiments of model-based event processing.

FIG. 1 illustrates an exemplary system 100 of managed entities which can generate events capable of being processed using embodiments of model-based event processing. The system 100 includes file system A 102, disk C: 104, computer F 106, computer B 108, messaging service X 110, messaging service Y 112 and data center M 114. As used herein, the term 'managed entity' may include anything of interest to a system administrator. For example, a managed entity can include hardware and/or software components such as an application (including a database application, email application, file server application, gaming application, productivity application, operating system, and so forth), a domain, a file system, particular hardware on a computer (such as a network card, a hard disk drive, a removable disk drive, one of multiple processors, and so forth), a virtual machine, a computer, a group of multiple computers, a sub net, an Internet gateway, a service, a data center, a cost center, a website, a webservice, a process, and so on. A system refers to a collection of one or more hardware and/or software components, including managed elements.

In system 100, computer F 106 includes disk C: 104 and runs file system A 102. Computer F 106 is also part of messaging service X 110 within data center M 114. Similarly, computer B 108 is part of messaging service Y 112 within data center M 114. In one implementation, the term 'service' as used herein may refer to multiple applications running on multiple computers. In yet another implementation, 'service' may refer to a single application running on a single computer.

Lines in FIG. 1 connecting managed entities denote relationships between the connected entities. Examples of relationships that can exist between managed entities include containment relationships, hosting relationships, communication relationships, dependency relationships, ownership relationships, etc. Containment relationships identify one managed entity as being contained by another managed entity. Often, data and definitions of a managed entity being contained are incorporated into the containing managed entity. Also, when one managed entity is contained by another managed entity, the containing managed entity can control both the lifetime and the visibility of the contained managed entity. The containing managed entity can also delegate behavior to the contained managed entity.

Hosting relationships identify dependencies among managed entities. In a hosting relationship, the hosting managed entity should be present in order for the guest managed entity to exist. Communication relationships identify managed entities that can communicate with one another, while dependency relationships identify one or more managed entities that are dependent on other managed entities. Similarly, ownership relationships identify managed entities that own, or have control over, other managed entities.

Moreover, several of the above types of relationships may be combined into a "multi-hop" relationship. For example, computer B 108 may be seen to be related to data center M 114 via a hop over messaging service Y 112. Often, if a system is modeled in an XML document (as will be discussed in more detail below), a multi-hop relationship can be expressed as an Xpath or Xquery, potentially traversing multiple relationship legs.

File system A 102 and computer F 106 may be considered directly related as may be data center M 114 and messaging services X 110 and Y 112. In contrast, entities such as messaging services X 110, and Y 112 are not directly related because no line is shown in FIG. 1 connecting them. However, in one exemplary embodiment, since both messaging services X 110, and Y 112 are related to data center M 114, messaging services X 110, and Y 112 may be seen to be indirectly related. It will be understood, however, that transitive relationships of this nature may not be recognized for all relationship types.

For purposes of illustration, an indirect relationship between file system A 102, computer F 106 and disk C: 104 may exist when disk C: 104 is contained within computer F 106, and file system A 102 runs on computer F 106. Thus, file system A 102 and computer F 106 have a 'runs on' type of relationship, while disk C: 104 and computer F 106 have a 'contained in' type relationship. In the two hop relationship between disk C: 104 and file system A 102, if disk C: 104 encounters bad blocks file system A 102 may experience slow responses from disk C: 104 as disk C: 104 corrects its problems. In this way, problems at disk C 104 may adversely affect the performance of file system 102. Correspondingly, it will be understood that the term relationship as used herein, will also include multi hop relationships between managed entities.

Managed entities can be defined to be related by a user or system administrator for a variety of reasons. For example, even though computer F 106, and computer B 108 are not directly related to one another, a system administrator may wish to record a relationship between them given that they are the same model type, or are subject to similar constraints, etc.

System 100 can include many more managed entities than are illustrated in FIG. 1. For example, system 100 can include multiple computers running multiple applications supporting multiple services. Additionally, system 100 can include various servers interconnected through assorted networking technologies, and so on.

As system 100 operates, the various managed entities generate events. The term 'event', as used herein, denotes any criteria, condition, occurrence or action that is of interest to a user or system administrator. For example, an event may include a snapshot of a condition of a managed entity, such as the amount of memory or processing capacity being used at computer F 106. Similarly, an event may include an error report communicating a problem with a managed entity. For example, a disk error reported at disk C: 104, or information regarding a managed entity, such as data from a performance counter, may also constitute events.

Events are reported through the use of instrumentation 116(*a-g*) associated with each managed entity in system 100. For example, events associated with file system A 102 are registered by and/or written to event records by instrumentation 116(*a*). Similarly, events associated with messaging service Y 112 are registered by and/or written to event records by instrumentation 116(*e*). Instrumentation 116 detects events and/or periodically examines the condition of the managed entity with which it is associated in order to develop events containing information relevant to system management efforts. This information, along with the identity of the managed entity with which the event is associated, is included in a record issued by the instrumentation. The structure and data contained in such records will be discussed in greater detail in conjunction with FIG. 3 below.

In one exemplary embodiment, instrumentation 116 is typed and customized according to the managed entity with which the instrumentation 116 is associated. For example, instrumentation 116(*b*) associated with disk C: 104 can be different than instrumentation 116(*d*) associated with computer F 106.

An Exemplary Model

Figure 2:
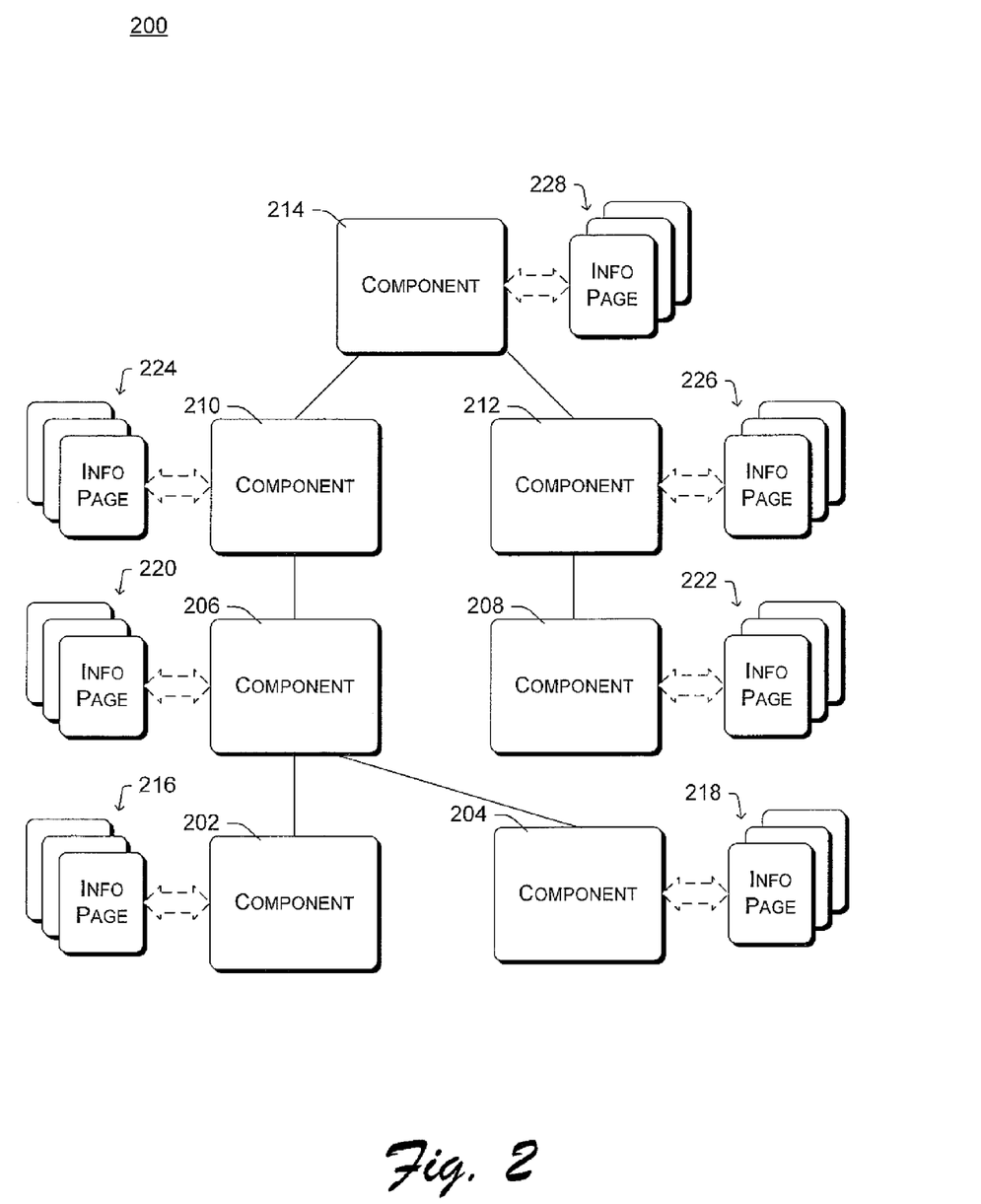
FIG. 2 illustrates an exemplary system definition model (SDM) that can be used with the model-based event processing described herein.

FIG. 2 illustrates a system definition model (SDM) 200 which is an abstract model of the system 100 shown in FIG. 1. It will also be understood, however, that a wide variety of approaches and modeling techniques outside of SDM may be used to effectively model system 100.

Generally, as the number of managed entities in system 100 increases, the complexity of system 100, including the complexity of direct and indirect relationships among managed entities in system 100, also increases. The abstract model 200 of system 100 can be authored during the development of system 100 and used to express the structure of the system 100.

As will be discussed in more detail below, a concrete model of system 100 may be created from model 200 by discovering specific information pertaining to the various managed entities and relationships in system 100. For example, a concrete model may be created by discovering real instances of the abstract classes and relationships found in model 200. A completed concrete model can accurately express the structure of system 100 and can be used by a user or administrator to better understand and manage system 100.

Returning to model 200, a user, such as a system administrator, can define one or more attributes which are associated with system 100 or which are associated with particular managed entities in system 100. Model 200 therefore can include managed entities modeled as components in FIG. 2 and corresponding relationships between those components. Thus, model 200 can describe a system that can be managed, wherein management of the system can include, for example, monitoring events associated with managed entities in the system, installing software on the system, monitoring the performance of the system, maintaining configuration information about the system, verifying that constraints within the system are satisfied, monitoring the integrity of the system from a security point of view, combinations thereof, and so forth.

As illustrated, model 200 includes a component corresponding to each managed entity (software and/or hardware) in a system being modeled. As discussed in conjunction with FIG. 1 above, examples of hardware and/or software components that could be in a system include an application (such as a database application, email application, file server application, gaming application, productivity application, operating system, and so forth), a domain, particular hardware on a computer (such as a network card, a hard disk drive, a removable disk drive, one of multiple processors, and so forth), a virtual machine, a computer, a group of multiple computers, a sub net, and Internet gateway, a service, a data center, a website, a webservice, a process, and so on.

Model 200 represents an abstract model of system 100, including components 202 through 214 which model file system A 102, disk C: 104, computer F 106, computer B 108, messaging service X 110, messaging service Y 112, and data center M 114, respectively. Similarly, the lines connecting components represent various types of relationships. Returning to the two hop example given above, the line connecting component 202 and component 206 may represent a 'runs on' type of relationship. Similarly, the line connecting component 206 and component 204 may represent a 'contained in' type of relationship.

Although the example model 200 includes seven components, in practice a system being modeled, and thus the model 200, can include any number of components, with each hardware or software component being managed in the system being represented by a component in model 200. For example, one component could represent a particular computer, while another component could represent an operating system running on that particular computer. By way of another example, yet another component could represent an operating system, while still another component could represent a database application running on the operating system. By way of yet another example, a component could be included in model 200 to represent a particular computer, while a related component could represent an operating system installed on that particular computer. Similarly, a component could be included to represents a virtual machine running on an operating system, and another component could be included to represent an operating system running on the virtual machine. In such an example, the operating systems could be the same or alternatively two different operating systems.

Model 200 is intended to be a comprehensive knowledge store, including all information used in managing system 100 in an abstract type specific manner. For example, systems of type 100 with varying numbers and instances of computers and messaging services could also be represented using model 200. Moreover, the knowledge and recipe to find components and relationships in a real system could also encoded in information pages, as will be discussed in more detail below.

Information in model 200 can include information regarding the particular managed elements in system 100, as well as relationships among the various managed elements in system 100. Despite this intent, it is to be appreciated that model 200 may alternatively contain only some of the information used in managing the system rather than all of the information.

Relationships existing between different managed elements in system 100 are illustrated in model 200 with lines connecting the related components. As noted above in conjunction with FIG. 1, examples of relationships that can exist between components include containment relationships (such as the 'contained in' relationship discussed above), hosting relationships (such as the 'runs on' relationship mentioned above), communication relationships, dependency relationships, and ownership relationships.

FIG. 2 also illustrates that one or more information (info) pages can be associated with each component in model 200. Information pages 216 are associated with component 202, information pages 218 are associated with component 204, information pages 220 are associated with component 206, information pages 222 are associated with component 208, information pages 224 are associated with component 210, information pages 226 are associated with component 212, and information pages 228 are associated with component 214. Each information page contains information about its associated component. Moreover, different types of information can be maintained for different components. In certain embodiments, different pages contain different types of information, such as one page containing installation information and another page containing constraint information. Alternatively, different types of information may be included on the same page, such as installation information and constraint information being included on the same page. Moreover, it will be understood that pages can be associated in the same way as components in model 200 (or managed entities in model 100). Stated another way, pages themselves may also be related.

Examples of types of information pages include installation pages, monitoring pages, service level agreement pages, description pages, relationship pages and so forth. Installation pages can include information describing how to install the associated component onto another component (e.g., install an application onto a computer), such as what files to copy onto a hard drive, what system settings need to be added or changed (such as data to include in an operating system registry), what configuration programs to run after files are copied onto the hard drive, and so forth.

Monitoring pages include information related to monitoring the performance and/or health of the associated component. This information can include rules describing how the associated component is to be monitored (e.g., what criteria and other occurrences make up events to look for when monitoring the component), as well as what actions to take when a particular rule is satisfied (e.g., record certain settings or other information when an event occurs, sound an alarm, etc.).

Service level agreement pages include information describing agreements between two or more parties regarding the associated component (e.g., between the purchaser of the associated component and the seller from which the associated component was purchased). These can be accessed during operation of the system to determine, for example, whether the agreement reached between the two or more parties is being met by the parties.

Description pages include information describing the associated component, such as various settings for the component, or other characteristics of the component. These settings or characteristics can include a name or other identifier of the component, the manufacturer of the component, when the component was installed or manufactured, performance characteristics of the component, and so forth. For example, a description page associated with a component that represents a computing device may include information about the amount of memory installed in the computing device. Similarly, a description page associated with a component that represents a processor may include information about the speed of the processor; and a description page associated with a component that represents a hard drive may include information about the storage capacity of the hard drive and the speed of the hard drive, and so forth.

Relationship pages include information regarding the various relationships the associated component has with other components. These relationships may be direct or indirect, and they may be set by users or administrators to help in the efforts of event processing. For example, relationship pages for a component may state that the component is directly related to several other components with which it regularly interacts (or with which it is electrically coupled). Moreover, the relationship pages may state that the component is indirectly related to other similar components on the basis of, for example, similar performed duties, similar compositions, or similar operating constraints among the subject component and the indirectly related components. Similarly, discovery pages encode instructions upon finding instances of a certain component or a certain relationship.

Thus, the information pages in model 200 maintain various information (e.g., installation, constraints, monitoring, discovery, etc.) regarding each component in the system 100. Despite the varied nature of these information pages, they are maintained together in model 200 and thus can all be readily accessed by various utilities or other applications involved in the management of a system of the type described by model 200.

In the discussions herein, reference is made to different classes of computing devices. Each of these different classes of computing devices refers to computing devices having particular common characteristics, so they are grouped together and viewed as a class of devices. Examples of different classes of devices include IIS (Internet Information Services) servers that are accessible to the Internet, IIS servers that are accessible only on an internal intranet, database servers, email servers, order processing servers, desktop computers, and so forth. Typically, each different class of computing device corresponds to one of the configurations in the system model.

Model 200 can also contain static information (e.g., the topology of software services within an application) and dynamic information (e.g., the control flow of a particular transaction). This information is used to describe components, system architecture, and transaction flows (e.g., a series of steps that perform a function).

Figure 3:
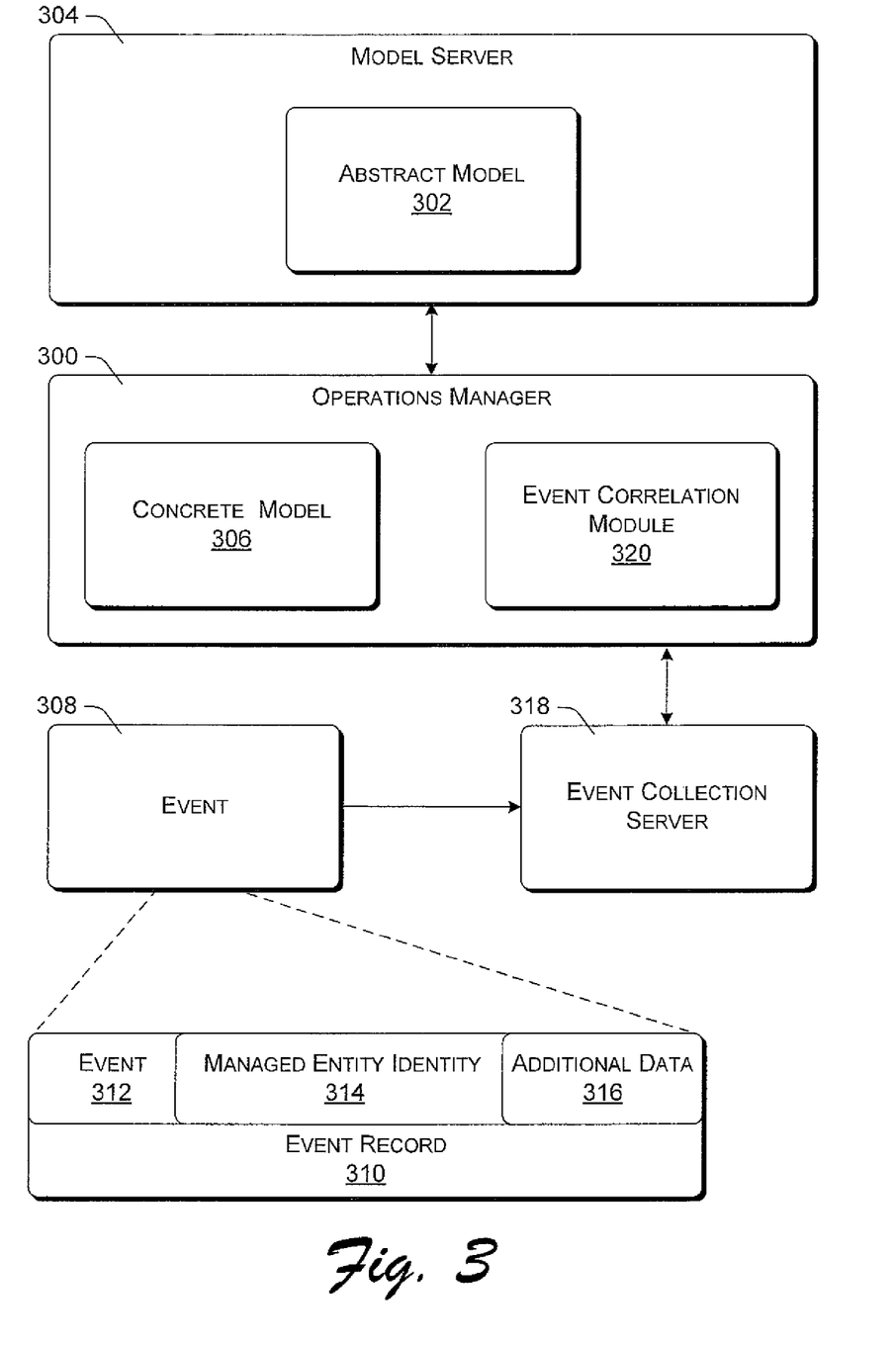
FIG. 3 illustrates an exemplary operations manager and event correlation module in which embodiments of model-based event processing can be implemented.

FIG. 3 illustrates an exemplary operations manager and event correlation module which can be used to implement model-based event processing. An operations manager 300 can be employed to import an abstract model 302 of system 100 from a model server 304 and create from the abstract model 302 a concrete model 306. In one implementation, such a concrete model can be created using information pages in the abstract model 200 which encode methods to discover the instances for the concrete model. Instances can be for classes as well as for relationships.

In one implementation, abstract model 302 includes model 200 discussed above in conjunction with FIG. 2. However, as noted previously, other types of abstract models of system 100 created using languages, approaches, and techniques other than the system definition model (SDM) discussed in conjunction with FIG. 2 may also be imported into operation manager 300. In one embodiment, abstract model 302 is retrieved from model server 304 in the form of an XML document.

Once operations manager 300 imports abstract model 302 and creates the corresponding concrete model 306, concrete model 306 can be saved in a database. This database can be hosted on a computer also hosting all or a portion of operations manager 300, or it may be remote from operations manager 300. Alternately, the database may be saved on various computers at various times, including or not including the computer(s) hosting operations manager 300.

As discussed above in conjunction with FIG. 1, each managed entity in system 100 (modeled in abstract model 302 and concrete model 306) is associated with instrumentation 116 configured to detect events 308 associated with the managed entities, and issue event records 310 including data concerning the events 308. Each event record 310 can have several fields, including an event field 312 which includes data concerning the event being reported, such as the nature of the event and the time in which the event occurred or was registered. Event record 310 can also include a managed entity identity field 314 containing a reference to the identity and/or type of the managed entity with which the event 308 is associated. In one implementation, this reference is a fixed schematized identifier known as a managed entity identifier (MEI). In one exemplary implementation, the MEI includes the identity of the managed entity. In another exemplary implementation, the MET includes an IP address which can be mapped to the identity of the managed entity from the model.

Event record 310 may also include other fields such as additional data field 316 in which supplemental data regarding event 308, the managed entity associated with event 308, or other information of interest to a user or administrator may be stored. Once issued by instrumentation 116, event record 310 is saved in event collection server 318, which may include a sequel database.

Event collection server 318 is accessible by event correlation module 320. In FIG. 3, event correlation module 320 is shown as residing in operations manager 300. It will be understood, however, that event correlation module 320 may reside in whole or in part outside of operations manager 300, or portions of event correlation module 320 may reside in operations manager 300—or on various other computers—at different times.

In one exemplary implementation, event correlation module 320 accesses event collection server 318 and compares the various event records 310 saved thereon in an effort to find event records 310 issued by managed entities having a relationship in accordance with abstract model 302 and/or concrete model 306. In one exemplary implementation, event correlation module 320 accomplishes this by viewing managed entity identifier fields 314 of the various event records 310 in event collection server 318. When managed entity identifier fields 314 are found which indicate managed entities having a relationship under abstract model 302 and/or concrete model 306, the event records 310 including the managed entity identity fields 314 (and their respective events 308) can be said to be correlated. Moreover, once event records 310 indicating correlated events 308 have been located, a report can be issued by event correlation module 320 to any user, administrator, or entity involved with event processing. This report can include an alert, or other indicators, in addition to various information from the event records 310 of the correlated events 308, such as the identities of the managed elements, the times the events 308 occurred (or were registered), and the nature of the correlated events 308 themselves. Report information can also be collected and used in the recordation of a new summary event for auditing and reporting in the future.

Event correlation module 320 can be programmed to search for varying types of relationships between managed entities represented in event records 310. For example, event correlation module 320 can be programmed to search only for direct relationships. Alternately, event correlation module 320 can be programmed to search only for indirect relationships. Moreover, the level of separation of relationships can also be made significant to event correlation module 320.

Additionally, since managed entities and relationships are typed, correlation logic can traverse instances of managed entities and relationships based on a query specifying type as well as attribute matching criteria. In this way, correlated events hanging off related managed entities can be located. For example, in one implementation database time out events may be related to disk block errors in RAID storage only if the database with which the time out events are associated is hosted on the same RAID device.

Exemplary Method

Figure 4:
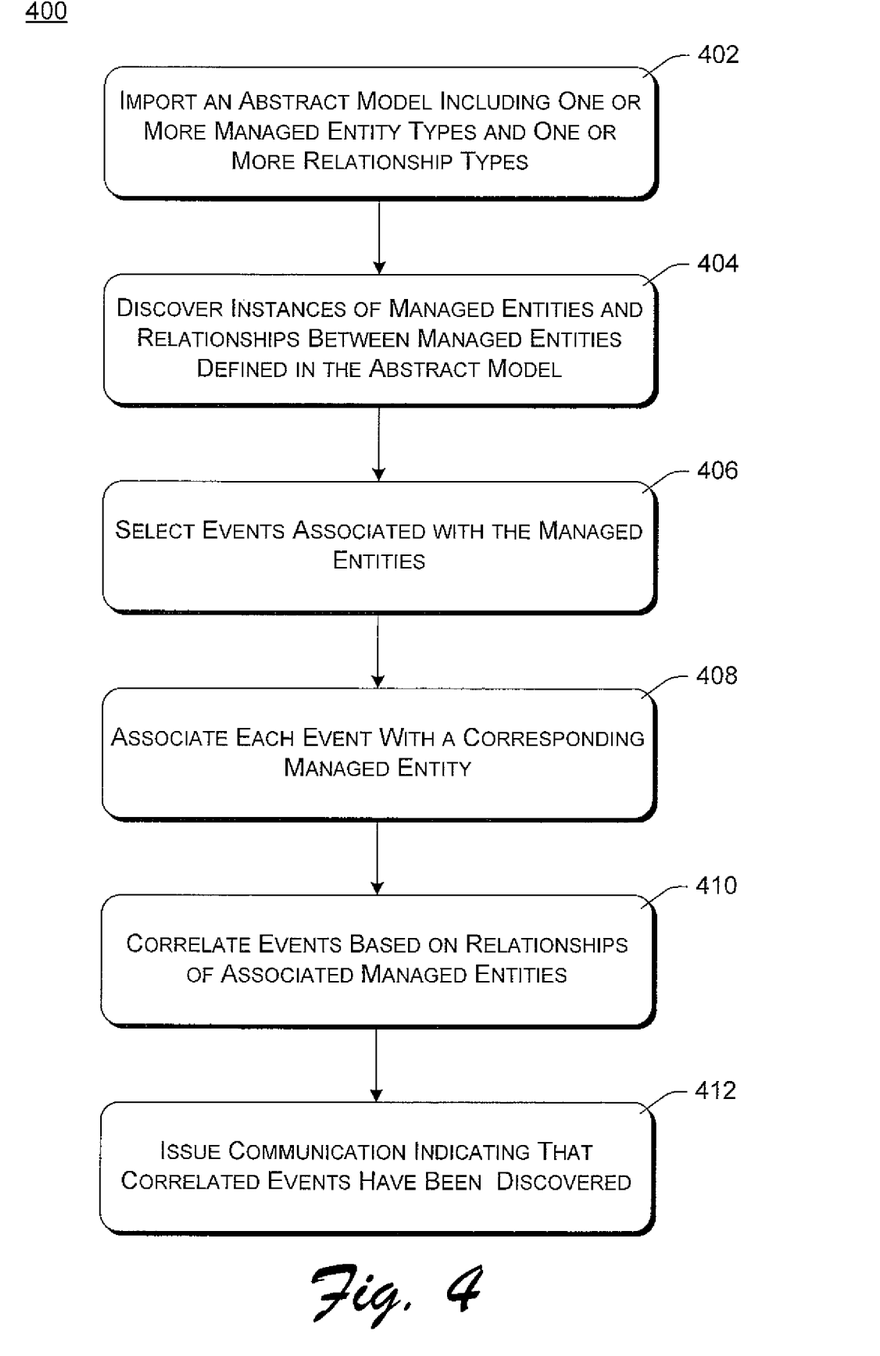
FIG. 4 illustrates exemplary method(s) for model-based event processing.

FIG. 4 illustrates an exemplary method 400 for model-based event processing and is described with reference to exemplary system 100, model 200, operations manager 300 and event correlation module 320 shown in FIGS. 1-3. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 402, an abstract model is retrieved. The abstract model includes one or more managed entity types as well as abstract definitions of one or more relationship types between components representing managed entities in the model. For example, the model may recognize that websites run on webservers. In one exemplary implementation, operations manager 300 can retrieve abstract model 302 of system 100 from model server 304.

At block 404, instances of managed entities defined in the abstract model and relationships between managed entities defined in the abstract model are discovered to create a concrete model. For example, relationships between components 202, 204, 206, 210, and 214 in model 200 are defined and quantified. Similarly, relationships between components 208, 212, and 214 in model 200 are defined and quantified. In one exemplary implementation, a concrete model is created by finding concrete instances and types of relationships between managed entities and their relationships during a discovery phase in an actual running environment of a system, such as system 100, which is being modeled. The concrete instances and types of relationships can be found using methods described in an abstract model of the system.

At block 406, events associated with the managed entities are selected. In one implementation, this includes collecting event records 310 stored in event collection server 318 through use of event correlation module 320. In other exemplary implementations, events may be subscribed to, gathered, filtered, or generated for managed entities using methods encoded in the abstract model. Moreover, selection criteria guiding event selection may be found in information pages associated with the various components representing managed entities in the abstract model.

Event records 310 may include several fields, including an event field 312 which includes data concerning the event being reported, a managed entity identity field 314 containing a reference to the identity and/or type of the managed entity with which the event 308 is associated, and additional data field 316 in which supplemental data regarding event 308, the managed entity associated with event 308, or other information of interest to a user or administrator may be stored.

At block 408 each accessed event is associated with its corresponding managed entity. In one implementation, the managed entity associated with a reported event 308 can be located by accessing the managed entity identity field 314 in the event record 310 reporting the event 308. The managed entity identity field 314 includes data regarding the identity of the managed entity with which the event is associated.

At block 410, events are correlated based on relationships between associated managed entities. For example, managed entity identity fields 314 among various event records 310 representing various events 308 are compared by event correlation module 320. When event records 310 are found which are associated with related managed entities (as reported by the corresponding managed entity identity fields 314) according to the abstract model 302 and/or the concrete model 306, the events 308 are deemed to be correlated by the event correlation module 320. In one exemplary implementation, events are correlated by following a correlation method described in terms of abstract classes and relationships within an abstract model of the system as found in a correlation information page.

At block 412, once correlated events have been isolated, a communication is issued indicating the discovery of the correlated events. In one implementation this communication can be issued by event correlation module 320 to any user, administrator, or entity involved with event processing and can include alerts, or other indicators, in addition to various information from the event records 310 of the correlated events 308. This information can include the identities of the managed elements, the times the events 308 occurred (or were registered), and the nature of the events 308 themselves.

Exemplary Computer Environment

Figure 5:
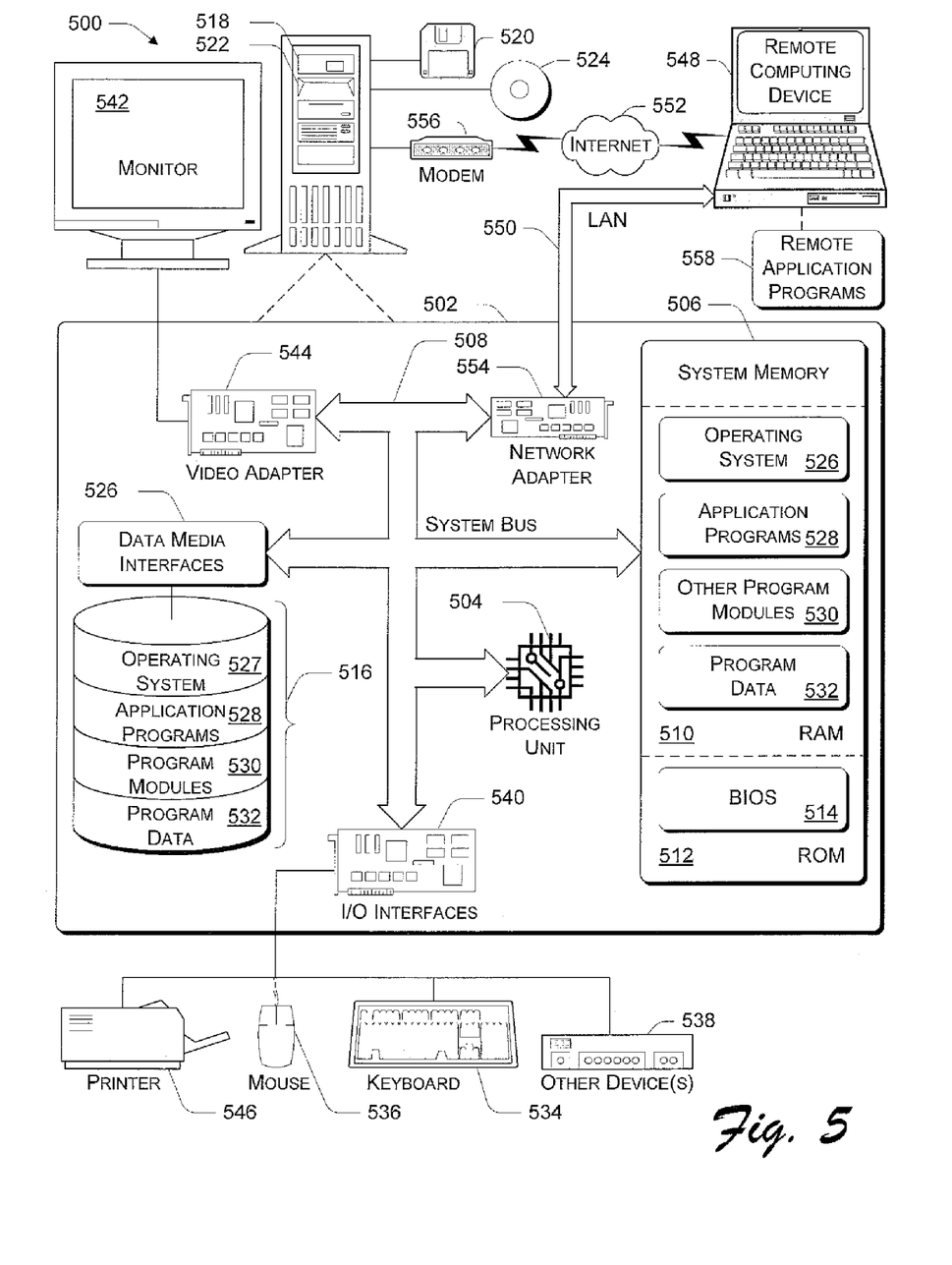
FIG. 5 illustrates an exemplary general computer environment in which embodiments of model-based event processing can be implemented.

FIG. 5 illustrates an example general computer environment 500, which can be used to implement the techniques described herein, and which may be representative, in whole or in part, of elements described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the example computer environment 500.

Computer environment 500 includes a general-purpose computing device in the form of a computer 502. Computer 502 can be, for example, a desktop computer, a handheld computer, a notebook or laptop computer, a server computer, a game console, and so on. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 527, one or more application programs 528, other program modules 530, and program data 532. Each of such operating system 527, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments of model-based event processing have been described in language specific to structural features and/or methods, it is to be understood that the appended claims are not necessarily limited to the specific features or methods described. Rather, the specific features and methods are disclosed as exemplary implementations of model-based event processing.

The invention claimed is:
1. A computer-implemented method comprising:
under control of one or more processors configured with executable instructions, retrieving an abstract model of a managed computing system, the abstract model including managed entities having information pages containing encoded methods defining at least one of: installation; monitoring; discovery; or relationships of the managed entities in the managed computing system;

discovering a concrete model of the managed computing system based on the encoded methods in the information pages in the abstract model, the concrete model including discovered types of the managed entities and discovered concrete instances of relationships between the managed entities;

identifying events associated with the managed entities based on the encoded methods in the information pages in the abstract model;

viewing identifier fields of each event of the identified events, each identifier field indicating a relationship of a managed entity of the managed entities to an event of the identified events;

comparing the relationships indicated by the identifier fields of the identified events and the relationships discovered in the concrete model, the comparing comprising:

determining, based on the encoded methods in the information pages in the abstract model, that the managed entities have a direct relationship or an indirect relationship according to the concrete model;

determining that the relationships indicated by the identifier fields of the identified events are associated with the managed entities having the direct relationship or the indirect relationship according in the concrete model; and determining that the identified events are correlated based on the determined direct relationship or the determined indirect relationship according to the concrete model.

2. A computer-implemented method as recited in claim 1, wherein the concrete model is expressed in a modeling language including at least one of: an XML Schema; a System definition Modeling language.

3. A computer-implemented method as recited in claim 1, wherein the managed entities include a domain, a computer, a sub net, a server, an application, an Internet gateway, a database, a disk, a service, a cost center, a data center, a website, a web service, and/or a process.

4. A computer-implemented method as recited in claim 1, wherein identifying the events comprises generating an event record commemorating each identified event, the event record including a reference to the managed entity with which the identified event is associated.

5. A computer-implemented method as recited in claim 1, wherein events include performance counters and metrics regarding a managed entity.

6. A computer-implemented method as recited in claim 1, further comprising issuing a report including information regarding correlated events and/or an alert.

7. A computer-implemented method as recited in claim 1, wherein identifying the events associated with the managed entities includes:

generating an event record for each identified event; and
storing each event record in a database.

8. A computer-implemented method as recited in claim 1, wherein the information pages containing encoded methods defining the relationships of the managed entities in the managed computing system include user defined statements, the user defined statements stating that managed entities in the managed computing system are directly related or indirectly related to other managed entities in the managed computing system.

9. A computer-implemented method comprising:

under control of one or more processors configured with executable instructions, retrieving an abstract model of a managed computing system, the abstract model including managed entities having information pages containing encoded methods defining at least one of: installation; monitoring; discovery; or relationships of the managed entities in the managed computing system;

creating a concrete model of the managed computing system comprising:

discovering types of the managed entities based on the encoded methods in the information pages in the abstract model, and discovering concrete instances of relationships among the managed entities based on the encoded methods in the information pages in the abstract model;

identifying events associated with the managed entities based on the encoded methods in the information pages in the abstract model;

generating information regarding the identified events associated with the managed entities, wherein generating the information comprises generating a record for each identified event including information regarding an identity of the managed entity associated with the identified event;

comparing the identity of each managed entity associated with each identified event and the relationships among the managed entities in the concrete model;

determining, based on the encoded methods in the information pages in the abstract model, that the managed entities associated with the identified events have a direct relationship or an indirect relationship defined by the concrete model; and identifying as correlated events, identified events associated with managed entities having the direct relationship or the indirect relationship defined by the concrete model.

10. A computer-implemented method as recited in claim 9, wherein records are generated from customized instrumentation associated with each managed entity.

11. A computer-implemented method as recited in claim 9, further comprising issuing a report and/or an alert when correlated events are identified.

12. One or more computer-readable storage media storing computer-readable instructions that, when executed by one or more processors, cause the one or more processors to:

retrieve an abstract model of a managed computing system, the abstract model including managed entities having information pages containing encoded methods defining at least one of: installation; monitoring; discovery; or relationships of the managed entities in the managed computing system;

discover instances of types of the managed entities and relationships between the managed entities described in the encoded methods in the information pages in the abstract model to create a concrete model during a runtime of the managed computing system;

select events associated with the managed entities based on the encoded methods in the information pages in the abstract model;

retrieve records associated with the selected events from an event collection server;

determine associations between the selected events and the managed entities by examining a managed entity identifier in each record associated with each event, wherein a selected event is determined to be associated with a managed entity if the managed entity identifier in a record associated with the selected event matches an identity of the managed entity;

compare the associations indicated by the managed entity identifiers and the relationships between the managed entities discovered in the concrete model, the comparing comprising:

determining, based on the encoded methods in the information pages in the abstract model, that the managed entities have a direct relationship or an indirect relationship according to the concrete model;

determining that the associations indicated by the managed entity identifiers are associated with the managed entities having the direct relationship or the indirect relationship according in the concrete model; and correlate the selected events associated with the managed entities having a direct relationship or an indirect relationship according to the concrete model.

13. One or more computer-readable storage media as recited in claim 12, further comprising computer-readable instructions that, when executed by the one or more processors, cause the one or more processors to issue a communication when correlated events are identified.

* * * * *